United States Patent

Ribaudo Bernales

(10) Patent No.: US 10,219,527 B2
(45) Date of Patent: Mar. 5, 2019

(54) METHOD FOR PRODUCING A DEHYDRATED FOOD WITH A HIGH CONTENT OF HYDROLYSED PROTEINS FROM FISH STICKWATER

(71) Applicant: Fernando Ricardo Ribaudo Bernales, Lima (PE)

(72) Inventor: Fernando Ricardo Ribaudo Bernales, Lima (PE)

(*) Notice: Subject to any disclaimer, the term of this patent is extended or adjusted under 35 U.S.C. 154(b) by 157 days.

(21) Appl. No.: 15/111,105

(22) PCT Filed: Aug. 17, 2015

(86) PCT No.: PCT/PE2015/000015
§ 371 (c)(1),
(2) Date: Jul. 12, 2016

(87) PCT Pub. No.: WO2016/099298
PCT Pub. Date: Jun. 23, 2016

(65) Prior Publication Data
US 2017/0049128 A1  Feb. 23, 2017

(51) Int. Cl.
*A23J 1/04* (2006.01)
*A23J 3/34* (2006.01)
(52) U.S. Cl.
CPC . *A23J 1/04* (2013.01); *A23J 3/34* (2013.01); *A23J 3/347* (2013.01)
(58) Field of Classification Search
USPC ........................................................ 426/422
See application file for complete search history.

(56) References Cited

U.S. PATENT DOCUMENTS

| 2,525,294 | A | | 10/1950 | Gunther | |
| 2,857,278 | A | | 10/1958 | Milner | |
| 4,251,557 | A | * | 2/1981 | Shimose | A23L 17/10 426/417 |
| 2016/0198737 | A1 | * | 7/2016 | Shirota | A23J 1/04 426/495 |

FOREIGN PATENT DOCUMENTS

| EP | 0990393 A1 | 5/2000 |
| ES | 2311990T T3 | 2/2009 |
| PE | 07492005 A1 | 1/2005 |

OTHER PUBLICATIONS

International Search Report for PCT/Pe2015/000015 (WO 2016/099298 A1).

(Continued)

*Primary Examiner* — Lien T Tran
(74) *Attorney, Agent, or Firm* — Husch Blackwell LLP

(57) ABSTRACT

The present invention refers to a method for obtaining dehydrated food with a high content of hydrolyzed proteins from fish stickwater; for this purpose, the insoluble solids and fat traces are separated the stickwater, which then undergoes a process of demineralization by electrodialysis, in order to then adjust its temperature and pH to proceed with the enzymatic hydrolysis that allows to fractionate the protein, which is then concentrated and spray dried, and then the dried product is finally conveniently packaged.

1 Claim, 1 Drawing Sheet

(56) References Cited

OTHER PUBLICATIONS

Jacobsen, F., Effect of Enzymatic Treatment of STickwter on Evaporator Capacity and Fouling,. Process Biochemistry (1989), vol. 20, ISSN 0032-9592. Abstract.

Pedersen, L.D., Crapo, C., et al. Membrane Filtration of Stickwater. Advances in Seafood Byproducts Alaska Sea Grant College Program AK-SG-03-01 (2003), pp. 359-369.

Medina, A.L., Vejar, F., et al. Desalado of los sueros lacteos by electrodalisis, Interciencia (1996). vol. 21 (4). ISSN 0378-1844, pp. 1-9. Retrieved from interned URL:<http://www.interciencia org/v21_4/communicaiones01.html>.

Cros, S., Lignot, B., et al., Desalination of mussel cooking juices by electrodialysis: effect on the aroma profile. Journal of Food Engineering (Jul. 2005), vol. 69, pp. 425-436.

\* cited by examiner

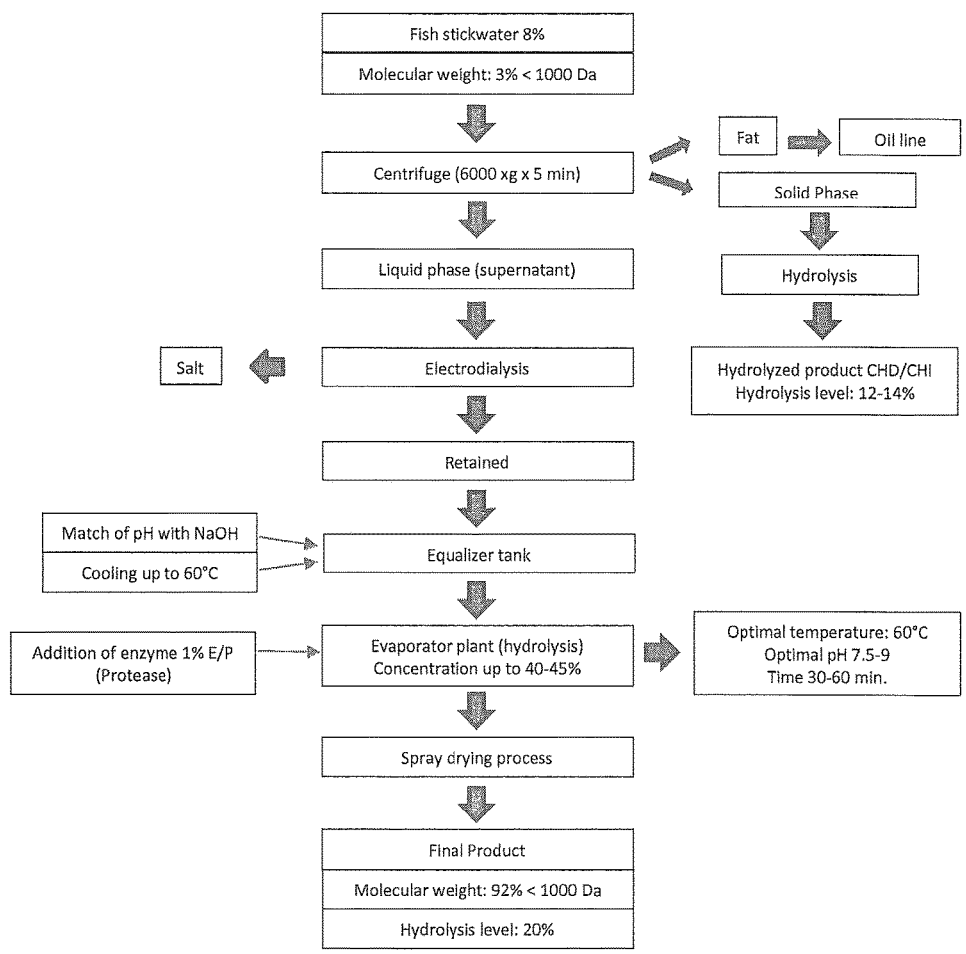

METHOD FOR PRODUCING A DEHYDRATED FOOD WITH A HIGH CONTENT OF HYDROLYSED PROTEINS FROM FISH STICKWATER

1. TECHNICAL SCOPE

This invention refers to a method for obtaining a dehydrated food with a high content of hydrolyzed proteins from stickwater, which can be used as food for human consumption directly or indirectly.

2. BACKGROUND

During the manufacturing process of fish meal, the raw material (fresh anchovy) is cooked and then undergoes a pressing process, obtaining a press liquor from which the suspended solids and the fat fraction (oil fish) are separated by centrifuging, remaining at the end a liquid called stickwater or fish stickwater. Stickwater can also mean the liquid fraction obtained from fish or cephalopods cooking broth (hereinafter fish) in the production process of canned foods or precooked products, which can then be subjected to a freezing or cure process. Fish stickwater mainly contains a large amount of soluble proteins, insoluble solids, vitamins and minerals (including salt), and fat traces with values that vary depending on the species processed. The amount of stickwater produced basically depends on the composition of the raw material and a suitable cooking and pressing process, which can be 20 and 70% of the processed fish in the case of fish meal. The total solids content in this liquid usually varies between 4-9%, with a variable fat content of 0.3-1.0%, depending on the raw material, its freshness, and centrifugal equipment available. The salt content is also variable, although it is common to see concentrations above 1% (w/w), as in the case of the fishmeal process.

What are the uses of stickwater?

Usually during the preparation of fish meal, stickwater undergoes a concentration process from 6-9% of solids to a final varying concentration of 35-45%, depending on the operational variables and additives used in this process. This concentrate is then incorporated into the production flow of fish meal, which is reflected in a higher volume of product made, with an increase of around 25%. As a result, stickwater recovery, in addition to solving an environmental problem, is highly profitable from the economic point of view. Alternatively, concentrated stickwater can be directly spray dried to a 5% level of humidity, in order to be used separately as an important additive of high biological value on CHI specialized food formulation. In general, concentrated stickwater provides among other components a series of nucleotides and genetic material involved in biochemical processes of attractability, immune stimulation and vital energy, as well as free amino acids, vitamins and minerals, where—according to recent research—the unknown growth factor generally attributed to fish meal can be found.

On the other hand, stickwater obtained from the cooking process in the canning and freezing industry is usually derived to effluent treatment systems, where oil with a high degree of oxidation and sludge are usually obtained and then subjected to a dehydration process to recover fish meal of very low quality.

What problems result from the use of stickwater?

Beyond the environmental and economic benefits that entail the use of this subproduct, the concentration process of stickwater, besides condensing the present soluble protein, can concentrate other solid compounds, including salt. By adding this concentrate to fish meal, salt is added at levels that often exceed the standard set by users for this compound (3.5%), lowering the quality of the final product. Depending on the quality of the processed raw material, stickwater concentrate incorporated to fish meal may also carry decomposition products like biogenic amines including histamine, and volatile nitrogenous bases that greatly lower the quality of fishmeal. The problem is further emphasized when the stickwater concentrate is dried directly and the final product achieves salt levels up to 15% (dry basis), making the percentage protein content relatively low (67%), which reduces the competitiveness of the product when compared with fish protein concentrates from other sources that are offered with a protein content greater than 80%.

Generally, the current use of stickwater favors the under-utilization of a major source of protein that, when used as a subproduct in the fish meal process, can lower the quality of this product and, if used as a separate consumable, it has low protein contents due to the salt content accumulated during its process.

Is there a technique used for the removal of salt (demineralized) from fish stickwater?

Now in the fishing industry, stickwater plants are evaporators and therefore tend to concentrate the compounds contained in this subproduct, increasing the salt content in the dehydrated concentrates obtained; i.e., no method or technique is applied to remove salt from fish stickwater.

Is there a proprietary technology for the production of hydrolyzed stickwater protein and what are the differences when compared to our proposal?

The invention patent request (ES 2 311 990 T3) for "Product of hydrolyzate marine protein, process for its production and application" discloses the obtaining of marine protein from any source and fish and shellfish species that generally includes subproducts such as stickwater. The method describes how the protein is obtained by separating it through filtering operations (Ultra and Nano), for which ultrafiltration systems with ceramic membranes are used and then nanofiltration systems that allow the removal of a smaller proportion of salt and biogenic amines.

In this regard, there are a number of differences between the above-mentioned patent and our proposal:

The procedure described in said patent registration (item 6 of claims) does not apply, unlike our proposal, an enzymatic hydrolysis process to stickwater and is only limited to filtering operations (Ultra and Nano).

Another substantial difference is that authors of said patent use ultrafiltration systems with ceramic membranes to remove salt from stickwater and then use nanofiltration to remove the salt and biogenic amines. In our case, our technology only involves electrodialysis to remove with greater efficiency the ions comprising sodium chloride and we do not use conventional filtration methods.

Finally, we also found another difference: the filtration systems applied allow part of the protein components of low molecular weight to pass through the filtration membranes and they are lost along with the water and undesirable compounds such as salt, smell and taste components. This results in the loss of protein components with important biological and technological functionality and reduces the process performance.

Instead, our procedure deals first with the demineralization of stickwater by electrical loads (electrodialysis) in order to make sure not to remove any protein component, because they all are larger than the electrodialysis membranes pores, thus ensuring a greatest number and better quality. Subsequently, hydrolysis allows us to reduce the molecular weight of the protein fractions to give them the desired functionality with the best possible performance.

3. BRIEF DESCRIPTION OF THE INVENTION

To resolve these drawbacks, by means of this invention, a new method for obtaining food with a high content of hydrolyzed protein obtained from fish stickwater is proposed. First, solids and fat remaining in stickwater are separated, and then begins the demineralization through a selective salt removal method, applying the electrodialysis technique, so that a greater quantity and quality of protein components are concentrated, avoiding loss of protein fractions due to not being subjected to filtration processes; then, the demineralized stickwater is pumped to an equalizer tank, where the temperature and pH is adjusted by adding NaOH: an enzymatic hydrolysis process reduces the molecular weight of the protein fractions to the desired functionality with the best possible performance; subsequently, the product obtained is subjected to an evaporation process in an evaporator plant; concluded the evaporation step, the hydrolyzate concentrate is stored in a buffer tank to be then subjected to a spray drying process; finally, the dried product is packaged.

4. BRIEF DESCRIPTION OF THE FIGURE

FIG. 1 shows the flowchart to carry out the method for obtaining food with a high content of hydrolyzed proteins from fish stickwater.

5. DETAILED DESCRIPTION OF THE INVENTION

The following describes in detail the method for obtaining food with a high content of hydrolyzed proteins from fish stickwater.

The process according to the invention consists of the following steps:

1—Stickwater from a fish with a high degree of freshness is subjected to a separation process of insoluble solids and fat traces by means of a separation equipment that may be a Sedicanter or a centrifugal disc operating at a speed from 3000 to 6000×g for 5 minutes, in order to remove impurities contained in the stickwater, thus preventing these compounds from interfering with the subsequent operations of physical separation or concentration.

2—The resulting liquor—consisting of refined stickwater—is placed on a conventional electrodialysis equipment consisting of a stack of anion and cation exchange membranes arranged alternately and separated by spacers that form two circuits, which allow on one hand a constant stickwater to be demineralized (circuit 1) and at the same time in a separate compartment there is a constant flow of weak brine (circuit 2), that additionally receives salt ions (sodium and chloride) that have been permeabilized by the above-mentioned membranes. The driving force of the process is a direct current between anodes and cathodes housed in the two ends of the stack, inside electrode plates.

When stickwater with the original salt content reaches the active area of the membranes, the DC voltage causes the positively charged cation ($Na^+$) to migrate toward the cathode, while the anion ($Cl^-$) goes to the anode system. When any of these ions reaches the ion exchange membranes, the properties of the membranes will determine whether the ion is rejected or accepted through them. The ions that can pass through the membranes are retained in the next compartment, since the next membrane has the opposite charge. Accordingly, while the stickwater flow runs through a demineralizing circuit, there is at the time a water flow parallel to another circuit that accumulates salt, forming concentrated brine.

3—Demineralized stickwater is pumped to an equalizer tank, where the temperature is adjusted to 60° C. and pH of 7.5-9 with the addition of NaOH. Under these conditions, stickwater is subjected to an evaporation process in an evaporator plant—which may be a falling film, vacuum evaporators or other means of evaporation—, adding at the beginning of this process and continuously an alkaline protease (endopeptidase) of bacterial origin (*Bacillus licheniformis*) in a proportion of 1% with respect to the protein content of stickwater, in order to hydrolyze the peptide bonds inside the protein molecules. The evaporation process—which takes 30 to 60 minutes depending on the type of evaporator plant used—ends when the concentrate reaches 40 to 45% of solids, and then subjected to a final heating process of 85° C. for 15 minutes to inactivate the enzyme.

4—After the evaporation step, the hydrolyzed concentrate—with a hydrolysis from 18 to 20%—is temporarily stored in a buffer tank to be subsequently pumped into a "spray dryer", allowing the dehydration of the product until it achieves a solids content from 90 to 95% and a moisture content between 3 and 5%.

5—The dry product—with 92% of protein, with molecular weights below 1000 daltons and a digestibility degree greater than 98%—is finally packaged with the use of flexible bags made of a moisture-resistant barrier, in order to avoid the rehydration of the product.

The following is claimed:

1. A method for obtaining dehydrated food, produced from fish stickwater; the method including the following steps:
   a. providing a quantity of stickwater having a protein content, insoluble solids, fat traces, and a salt;
   b. separating the insoluble solids and fat traces from the stickwater by means of a separation operating at a speed of 3000 to 6000×/g for 5 minutes;
   c. demineralizing the stickwater with an electrodialysis equipment to provide a demineralized stickwater, wherein the salt is removed from the stickwater;
   d. pumping the demineralized stickwater to an equalizer tank, adjusting a temperature to 60° C. and a pH of 7.5-9 with an addition of NaOH; then, evaporating the demineralized stickwater to a solids content from 40% to 45%, and during this process, an alkaline protease enzyme of bacterial origin in a proportion of 1% with respect to the protein content of the demineralized stickwater is added to hydrolyze the protein to a hydrolysis level of 18-20%, to provide an evaporated and hydrolyzed protein-containing stickwater; then subjecting the evaporated and hydrolyzed protein-containing stickwater to a final heating process of 85° C. for 15 minutes to inactivate the enzyme, to provide a hydrolyzed protein-containing and heated stickwater;
   e. temporarily storing the hydrolyzed protein-containing and heated stickwater in a buffer tank and then dehydrating the stored stickwater until it achieves a solids content from 90 to 95% and a moisture content between 3 and 5%, with 92% of protein with molecular weights below 1000 daltons and a digestibility degree greater than 98%; and then f. packaging the dehydrated stickwater.

* * * * *